(12) United States Patent
Atsumi et al.

(10) Patent No.: US 6,336,947 B1
(45) Date of Patent: Jan. 8, 2002

(54) AIR FILTER

(75) Inventors: Yutaka Atsumi; Jun Suzuki, both of Hamakita; Takeo Jo; Katsumi Osaka, both of Tokushima, all of (JP)

(73) Assignees: Toyo Roki Seizo Kabushiki Kaisha, Shizuoka-ken; Awa Paper Mfg. Co., Ltd., Tokushima-ken, both of (JP)

( * ) Notice: Subject to any disclaimer, the term of this patent is extended or adjusted under 35 U.S.C. 154(b) by 0 days.

(21) Appl. No.: 09/562,864

(22) Filed: May 1, 2000

(51) Int. Cl.[7] ............................................. B01D 46/00
(52) U.S. Cl. ....................... 55/385.3; 55/486; 55/487; 55/524; 55/DIG. 5; 427/207.1; 428/317.7
(58) Field of Search ............................ 55/385.1, 385.3, 55/524, DIG. 5, DIG. 13, DIG. 24, 486, 487, 528; 95/285; 427/207.1, 244; 428/159, 308.4, 311.11, 316.6, 317.7

(56) References Cited

U.S. PATENT DOCUMENTS

| | | | | |
|---|---|---|---|---|
| 2,751,039 A | * | 6/1956 | Hanly et al. ................... | 55/524 |
| 2,961,710 A | * | 11/1960 | Stark ...................... | 55/DIG. 13 |
| 3,201,926 A | * | 8/1965 | Harrington .................... | 55/524 |
| 3,400,520 A | * | 9/1968 | Sakurai ........................ | 55/524 |
| 4,093,437 A | * | 6/1978 | Ichihara et al. ................ | 55/524 |
| 4,099,943 A | * | 7/1978 | Fischman et al. .............. | 55/524 |
| 4,631,077 A | * | 12/1986 | Spicer et al. .................. | 55/524 |
| 4,758,460 A | * | 7/1988 | Spicer et al. .................. | 55/524 |
| 5,129,923 A | * | 7/1992 | Hunter et al. .................. | 55/524 |
| 5,573,811 A | * | 11/1996 | Townsley ..................... | 55/524 |

* cited by examiner

Primary Examiner—David A. Simmons
Assistant Examiner—Minh-Chau T. Pham
(74) Attorney, Agent, or Firm—Young & Thompson

(57) ABSTRACT

The object of the present invention is to provide an air filter where the lifetime of the air filter is long and a carbon dust can be efficiently caught with keeping the cost low. The air filter of the present invention comprises a first filter layer 11 impregnated with oil; an oil repellent layer 11a disposed in the downstream side of the first filter layer 11, having the property of repelling the oil; and a second filter layer 12 disposed in the downstream side of the oil repellent layer 11a, impregnated with no oil. The transfer of the oil to the second filter layer 12 is controlled by the oil repellent layer 11a.

10 Claims, 3 Drawing Sheets

AIR FILTER

BACKGROUND OF THE INVENTION

The present invention relates to an air filter, especially an air filter which can efficiently catch a carbon dust.

As an air filter for vehicles, a wet type filter made up of paper impregnated with oil is known. Typically, viscous oil is used as impregnating oil, and such a filter is called a "viscous-type" air filter as a popular name. The viscous-type air filter has the merit of lengthening its lifetime as compared to a dry type filter which is not impregnated with oil. In the viscous-type air filter, the function of absorbing an other dust particle to a surface of a dust particle is generated because an absorbed dust particle is impregnated with oil after this particle is absorbed to a surface of the filter. In such a mechanism, since the dust particles can be caught one after another, absorption ability per a volume of the filter is increased.

And, an improved viscous type air filter is mentioned in Japanese utility model publication No. S63-27767. In the air filter mentioned in Japanese utility model publication No. S63-27767, the first filter member having comparably high density and the second filter member having comparably low density are laminated. Because of applying such a laminating construction, the rate of oil impregnation of the first filter member is made different from that of the second filter member, and accordingly, clogging of the filter is prevented so that the dust is efficiently caught.

However, there is the fault that a carbon dust can not be efficiently caught by the wet type filter impregnated with oil. On the other hand, the carbon dust can be efficiently caught by using the dry type filter which is not impregnated with oil, but there is the fault that the lifetime of the filter comes to be shortened in the case where a filter paper is used Furthermore, the cost is unfortunately increased in the case where non woven fabric is used alone.

It is an object of the present invention to provide an air filter in which the carbon dust can be efficiently caught and the cost can be lowered.

SUMMARY OF THE INVENTION

The air filter of the present invention comprises a first filter layer impregnated with oil; an oil repellent layer disposed in the downstream side of the first filter layer, having the property of repelling the oil; and a second filter layer disposed in the downstream side of the oil repellent layer, impregnated with no oil. And the transfer of the oil to the second filter layer is controlled by the oil repellent layer.

According to the invention, because the oil of the first filter layer is repelled by the oil repellent layer, the oil is hardly transferred to the second filter layer. Accordingly, the performance of the second filter layer impregnated with no oil is fully displayed.

In the above air filter, a carbon dust may be caught by the second filter layer.

In this case, because the oil of the first filter layer is repelled by the oil repellent layer, the oil is hardly transferred to the second filter layer. Accordingly, the performance of the second filter layer impregnated with no oil is fully displayed so that the carbon dust can be efficiently caught.

In the above air filter, the first filter layer and the oil repellent layer may be integrated so as to be formed as an integral layer.

In this case, because the first filter layer and the oil repellent layer can be formed as a layer, the construction of the layers can be made simple and the thickness of the whole filter can be made small.

In the above air filter, the oil repellent layer may be formed by coating an oil repellent agent on a surface of the integral layer.

In this case, the oil repellent layer can be formed by a simple process.

In the above air filter, pores of the second filter layer may be more coarse than pores of the first filter layer.

In this case, the influence of the second filter layer to the pressure loss is reduced and the pressure lose of the whole filter can be suppressed.

In the above air filter, the second filter layer may compose one of a non woven fabric and a filter paper.

In this case, because the second filter layer comprises a non woven fabric or a filter paper, the carbon dust can be efficiently caught by contact filtration.

In the above air filter, the air filter may be capable of being attached to an intake path of an engine.

In this case, the carbon dust can be efficiently removed from the intake air of the engine. And, inhalation of the oil to the engine can be prevented.

BRIEF DESCRIPTION OF THE DRAWINGS

FIG. 2 is a sectional view of a filter member.

DETAILED DESCRIPTION OF THE PREFERRED EMBODIMENTS

The preferred embodiment of the present invention will now be explained below with reference to FIGS. 1 to 3.

Figure 1:
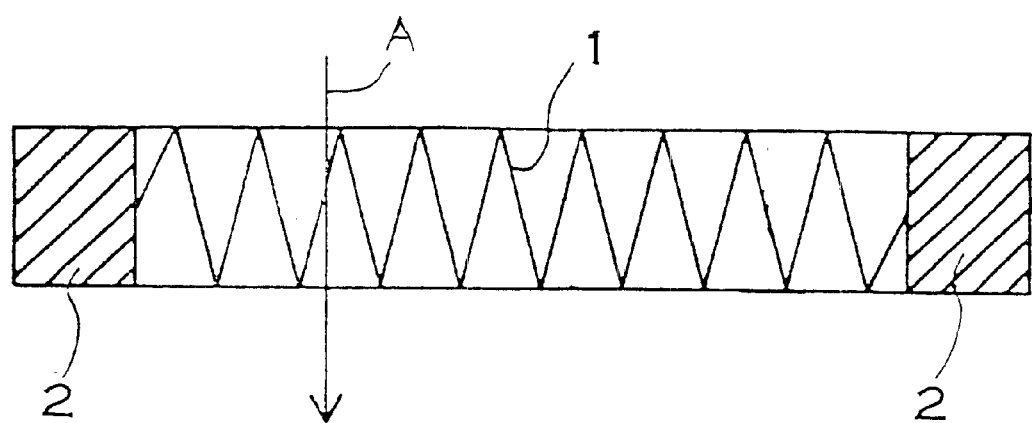
FIG. 1 is a sectional view showing an embodiment of an air filter by the present invention.

The embodiment of the air filter shown in FIG. 1 comprises a folded filter member 1 and a plastic frame member 2, formed in the shape of a rectangle, holding the filter member 1. As shown in FIG. 1, the filter member 1 is formed so as to be inserted into the frame member 2 about the periphery of the filter element 1, and is fixed to the frame member 2.

Figure 2A:
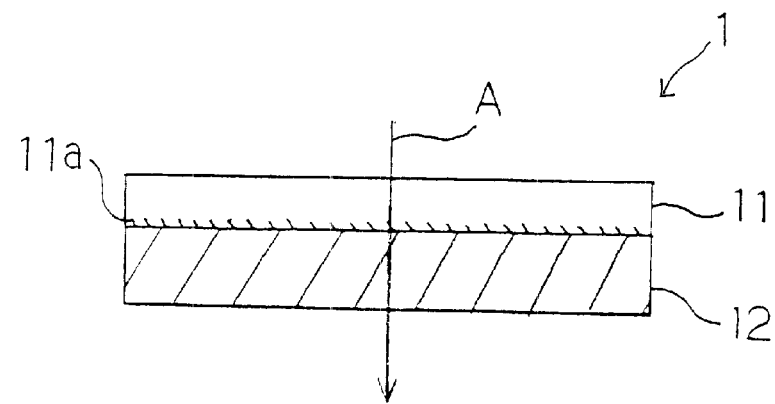
FIG. 2A is a sectional view of a filter member used in the air filter shown in FIG. 1.

As shown in FIG. 2A, the filter member 1 is provided with the first filter layer 11 in which a filter paper is impregnated with oil such as viscous oil, and the second filter layer 12 comprising a non woven fabric or a filter paper which is not impregnated with oil.

In FIG. 2A, an oil repellent layer 11a or a water repellent layer 11a, which is impregnated with an oil repellent agent or a water repellent agent, is formed in the side of the lower surface of the first filter layer 11.

The property of repelling oil, which the oil repellent layer 11a or the water repellent layer 11a has, can prevent oil impregnating the first filter layer 11 from transferring to the second filter layer 12 or can control the transfer of oil. On the other hand, in FIG. 2A, oil impregnating the first filter layer 11 exudes on the upper surface of the first filter layer 11 so that the state where the dust is easy to be caught is made.

As the oil repellent agent or the water repellent agent for the oil repellent layer 11a, any agent having the property of repelling oil, such as fluorine contained resin, can be freely chosen. To form the oil repellent layer (or the water repellent layer) 11a, a process by which the oil repellent agent or the water repellent agent is coated on the lower surface of the first filter layer 11 in FIG. 2A can be adopted, and, for example, all kinds of coating method such as a spray method, a roller coating method (such as a direct roller coating method or a kiss coating method (an offset roller coating method) and a dipping method) can be used. Using these coating methods has the merit that the oil repellent layer (or the water repellent layer) 11a can be formed by a simple process.

Figure 3:
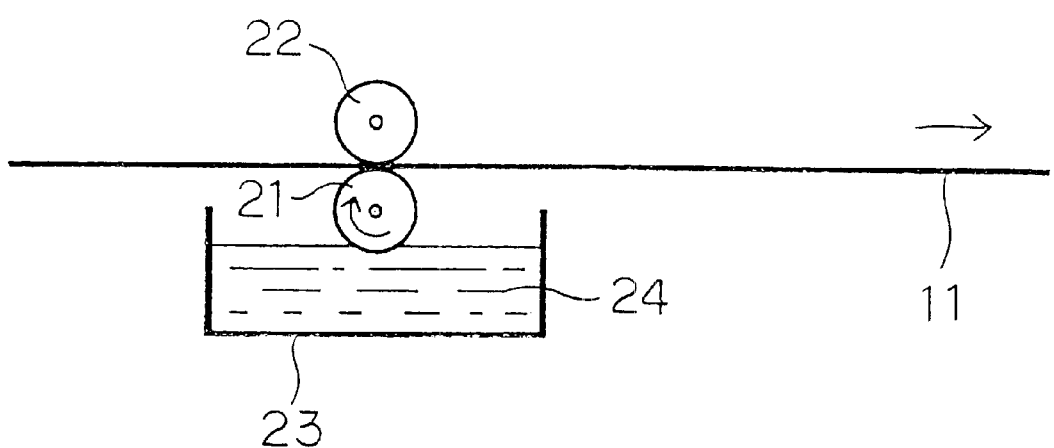
FIG. 3 is a view showing the process of coating an oil repellent layer.

FIG. 3 shows the process of coating the oil repellent agent or the water repellent agent by using a direct roller coating method. As shown in FIG. 3, by passing the first filter layer 11 between two rollers 21 and 22, a solution 24, received in a container 23, including the oil repellent agent or the water repellent agent is brought by the roller 21 so as to be coated on a surface of the first filter layer 11. By drying the solution 24, the oil repellent layer (or the water repellent layer) 11a can be formed in the first filter layer 11. In the case where fluorine contained resin is used as the oil repellent agent for example, a solution in which fluorine contained resin is dissolved can be used as the solution 24.

As the poresize of the first filter layer 11, an appreciate value, for example, a value from 80 μm to 150 μm, can be chosen according to performance which is requested as to the air filter. The value of the poresize is settled by considering the diameter of the dust particles and the pressure loss because the dust particles are caught in a state where the dust particles are hung to the pores of the filter.

On the other hand, in the second filter layer 12 in which a non woven fabric or a filter paper impregnated with no oil is used, the poresize is settled to a value, for example, between 80 μm and 200 μm. As is mentioned above, in the second filter layer 12, a non woven fabric or a filter paper in which the poresize is comparably large and the pores are coarse because the carbon dusts are caught by contact filtration and the pores shouldn't be necessarily fine.

The first filter layer 11 and the second filter layer 12 are joined mutually in a state where the air can pass through the joining plane. The joining is achieved by laminating the oil repellent layer 11a and the second filter layer 12 after the oil repellent layer 11a of the first filter layer 11 is formed. After the first filter layer 11 and the second filter layer 12 are joined, the first filter layer 11 is additionally impregnated with oil.

The operation of the embodiment of the air filter will be explained below. An arrow represented by the code "A" shows the direction of an air flow. As shown in FIG. 2A, the air passes through the first filter layer 11 at first, and secondly passes the second filter layer 12.

Since the first filter layer 11 is a wet type filter which is impregnated with oil as stated above, the dust in the air can be efficiently caught in the first filter layer 11. However, the carbon dust in the air can not be efficiently caught by the filter paper impregnated with oil in general, and the dust which can be efficiently caught in the first filter layer 11 is other than the carbon dust.

The air which has passed through the first filter layer 11 enters the second filter layer 12. As stated above, the second filter layer 12 is a dry type filter impregnated with no oil and can catch the carbon dust efficiently. As stated above, the carbon dust is caught by contact filtration in the second filter layer 12.

Thus, in the embodiment of the air filter, the dust other than the carbon dust is efficiently caught in the first filter layer 11, and the carbon dust which has passed through the first filter layer 11 is caught efficiently in the second filter layer 12. Accordingly, not only the carbon dust but also the other kinds of dust can be caught efficiently by the whole filter. And furthermore, although the poresize comes to be decreased toward the downstream side of the air flow in an usual air filter, the second filter layer 12 catches the carbon dust by contact filtration in the embodiment. Accordingly, there is the merit that the pressure loss can be decreased because the pores of the second filter layer 12 can be made comparably coarse.

Oil is generally transferred toward the downstream side of the air flow by phenomena so-called "carrying-away by the air" in a wet type filter. However, since the oil repellent layer (or the water repellent layer) 11a is provided in the area of the downstream side in the first filter layer 11, a state where oil is not easy to be transferred toward the downstream side across the oil repellent layer 11a is achieved by the property of repelling oil of the oil repellent layer (or the water repellent layer) 11a.

The performance of catching the carbon dust is affected by the amount of oil impregnating a filter layer in general and the degradation of the performance occurs by impregnating of oil. Accordingly, if oil impregnates the second filter layer 12, the carbon dust comes to be not able to be caught efficiently. However, since the transfer of oil is controlled by the oil repellent layer (or the water repellent layer) 11a as stated above, oil is hardly transferred from the first filter layer 11 toward the second filter layer 12. Thus the second filter layer 12 can be kept dry so that there is no possibility of depressing the performance of catching the carbon dust.

And, since oil is hardly transferred to the second filter layer 12, there is no possibility that oil is carried away serially toward the downstream side from the second filter layer 12 in effect. Thus the debit that oil is inhaled into an engine for vehicles is not generated if the embodiment of the air filter is attached to the intake path of the engine.

Furthermore, in the case where the embodiment of the air filter is used as an air filter for vehicles, the whole thickness of the filter member 1 is preferably settle to a value between 1 mm and 3.5 mm (more preferably a value between 1.1 mm and 1.5 mm). As shown in FIG. 1, in the embodiment, the substantial area is increased by folding the filter member 1, however, the filter member may be used in the state where it is spread flatly. The filter member 1 may roll to form a tube so that the air flows from the inside of the tube to the outside thereof or from the outside of the tube to the inside thereof.

Figure 2B:
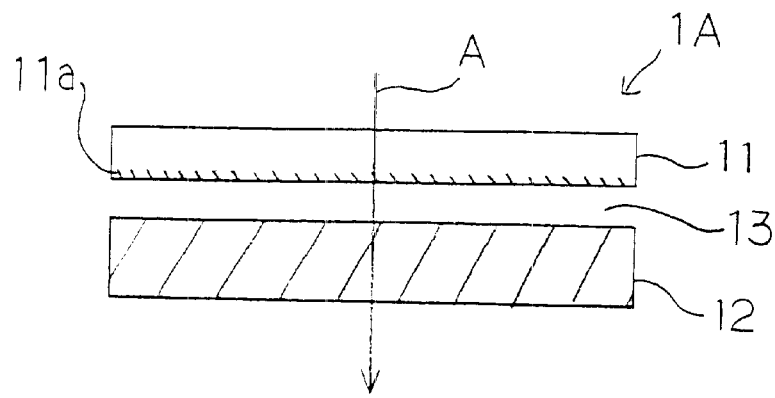
FIG. 2B is a sectional view of a filter member in which a space is formed between the first filter layer and the second filter layer.

Although the first filter layer 11 and the second layer 12 are joined in the embodiment, a filter member 1A in which an air layer 13 is formed between the first filter layer 11 and the second layer 12 may be used as shown in FIG. 2B. For example, by inserting an appreciate member between the first filter layer 11 and the second filter layer 12, the air layer 13 can be kept.

Although the oil repellent layer (or the water repellent layer) 11a is formed in a part of the first filter layer 11 in the embodiment, the oil repellent layer (or the water repellent layer) can be composed as a separate layer. In this case, an oil repellent layer (or a water repellent layer) may be formed between a wet type filter layer impregnated with oil and a dry type layer impregnated with no oil. In the case where the oil repellent layer (or the water repellent layer) is formed as a separate layer, the oil repellent layer may be formed in a method where an oil repellent agent (or a water repellent agent) is coated or the oil repellent layer may be formed by using fiber having the property of repelling oil Instead of forming the oil repellent layer 11a in the first filter layer 11, the oil repellent layer (or the water repellent layer) may be formed in the area of the upper stream side in the second filter layer. All of the other methods of forming the oil repellent layer (or the water repellent layer) can be adopted. Only the construction in which a wet type filter layer, an oil repellent layer (or a water repellent layer), and a dry type filter layer are arranged in the order named along the air flow needs to be adopted. Another filter layer can be inserted between any two layers chosen from among the wet type filter layer, the oil repellent layer (or the water repellent layer) or the dry type filter layer. A wet type filter layer, an oil repellent layer (or a water repellent layer), a member for supporting a dry type filter layer, or a member for keeping an air layer between other layers may be also inserted between the two layers. And furthermore, a filter other than the air filter of the present invention can be used with laminated to the air filter.

And furthermore, the word "oil repellent layer" in claims represents the words "oil repellent layer" and "water repellent layer" used in the embodiment.

According to the present invention, because the air filter comprises a first filter layer impregnated with oil, an oil repellent layer disposed in the downstream side of the first filter layer, having the property of repelling the oil, and a second filter layer disposed in the downstream side of the oil repellent layer, impregnated with no oil, the oil of the first filter layer is repelled by the oil repellent layer and the oil is hardly transferred to the second filter layer. Accordingly, the performance of the second filter layer impregnated with no oil can be displayed. Thus, the carbon dust can be efficiently caught.

What is claimed is:

1. An air filter comprising:

a first filter layer impregnated with oil;

an oil repellent layer disposed in the downstream side of the first filter layer, having the property of repelling the oil; and a second filter layer disposed in the downstream side of the oil repellent layer, impregnated with no oil and adapted to capture carbon dust;

wherein the transfer of the oil to the second filter layer is controlled by the oil repellent layer and wherein the air filter is adapted to be attached to an intake path of an engine.

2. An air filter according to claim 1, wherein the first filter layer and the oil repellent layer are integrated so as to be formed as an integral layer.

3. An air filter according to claim 2, wherein the oil repellent layer is formed by coating an oil repellent agent on a surface of the integral layer.

4. An air filter according to claim 1, wherein pores of the second filter layer are more coarse than pores of the first filter layer.

5. An air filter according to claim 2, wherein pores of the second filter layer are more coarse than pores of the first filter layer.

6. An air filter according to claim 3, wherein pores of the second filter layer are more coarse than pores of the first filter layer.

7. An air filter according to claim 1, wherein the second filter layer composes one of a non woven fabric and a filter paper.

8. An air filter according to claim 2, wherein the second filter layer composes one of a non woven fabric and a filter paper.

9. An air filter according to claim 3, wherein the second filter layer composes one of a non woven fabric and a filter paper.

10. An air filter according to claim 1, wherein the first filter layer and the second filter layer are separated by an air layer.

* * * * *